June 18, 1968     H. H. RICE ETAL     3,389,215
HIGH TEMPERATURE ALUMINA-TO-NIOBIUM ARTICLE
Filed March 4, 1966
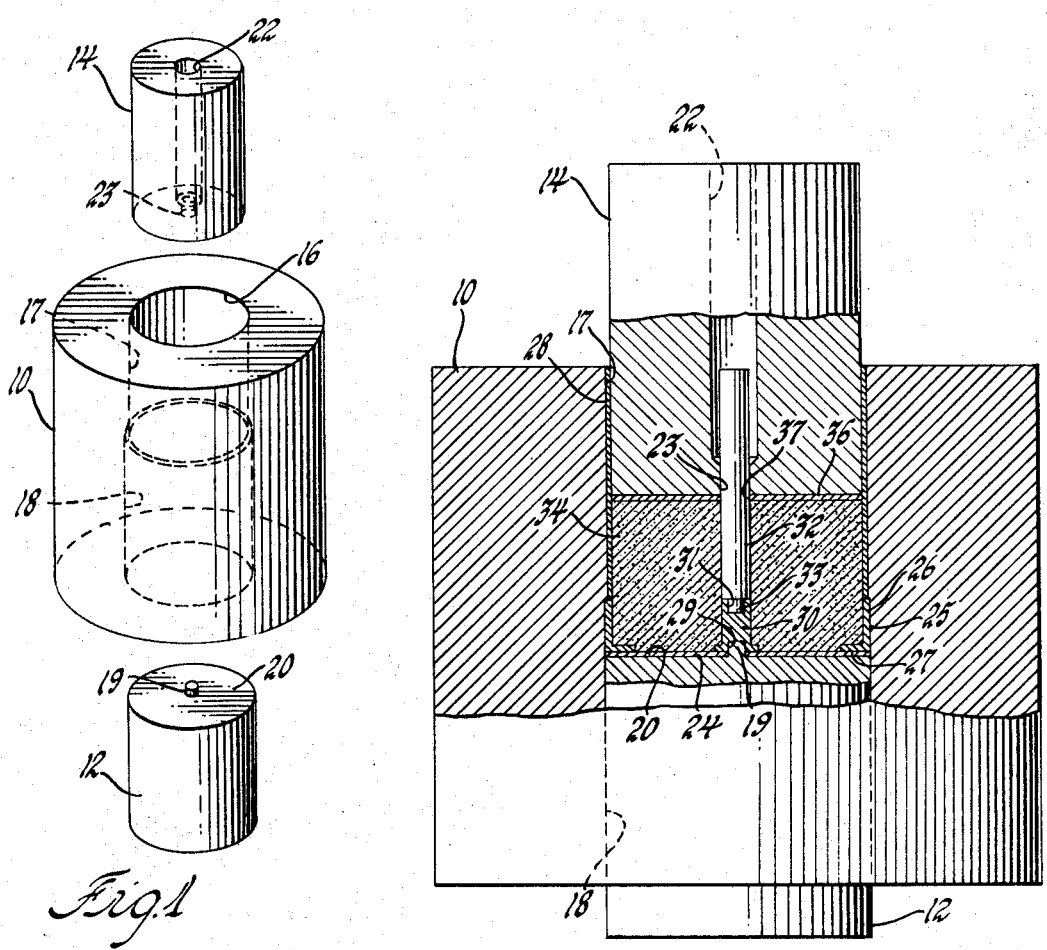
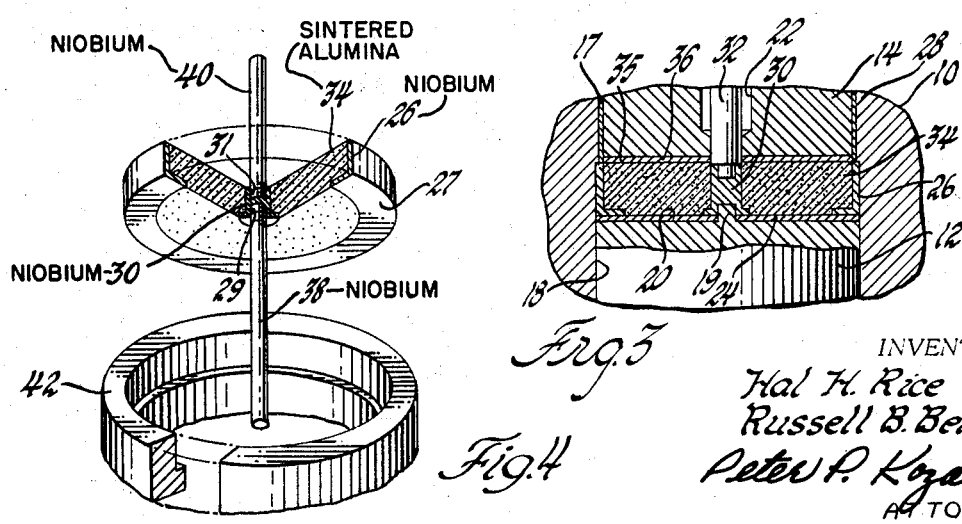
INVENTORS
Hal H. Rice &
Russell B. Bennett
Peter P. Kozak
ATTORNEY United States Patent Office 3,389,215
Patented June 18, 1968

3,389,215
HIGH TEMPERATURE ALUMINA-TO-
NIOBIUM ARTICLE
Hal H. Rice, Birmingham, and Russell B. Bennett, Rochester, Mich., assignors to General Motors Corporation, Detroit, Mich., a corporation of Delaware
Filed Mar. 4, 1966, Ser. No. 531,919
4 Claims. (Cl. 174—152)

ABSTRACT OF THE DISCLOSURE

An alumina-to-niobium article is suitable for use in vacuum-type devices which are subjected to high temperatures and a method for making the same. The alumina-to-niobium article consists of a sintered alumina body in the form of a disc having a niobium electrode passing through the center of the disc and having a niobium annular ring bonded to the outer periphery at one side of the disc. This alumina-to-niobium article can be used to form a vacuum-tight seal which will remain vacuum-tight at elevated temperatures which are below the sintering temperature of the alumina. The method of preparing this article includes the steps of placing alumina particulate around niobium metal members in a mold, heating the alumina and niobium to the sintering temperature of the alumina and applying pressure to the alumina in the mold.

This invention relates to composite ceramic-to-metal articles and more particularly to a method of bonding the ceramic portion to the metal portion whereby a high temperature vacuum-tight ceramic-to-metal seal is obtained therebetween.

Ceramic-to-metal seals are widely used in vacuum devices such as electron tubes, particle accelerators, and the like. Ceramic-to-metal seals for electrode assemblies used in vacuum devices are usually formed by metallizing a fired ceramic insulator and subsequently attaching metal members to the metallized layers with brazing alloys, such as solder. Metallizing the fired ceramic insulator to form a bond between the ceramic and the metal is generally accomplished by using either the sintered metal powder process or the active metal process. Vacuum-type ceramic-to-metal seals made by attaching metal members to a fired ceramic body having a metallized layer thereon, however, usually fail at elevated temperatures because of the low melting point of the brazing alloys which bond the metal members to the metallized layer.

It is an object of this invention to provide a vacuum-tight ceramic-to-metal seal adapted to be operative at elevated temperatures and a method for producing such a seal in situ from ceramic powder and metal members.

These and other objects are accomplished by a method whereby metal members are first placed in a mold and then ceramic particulate is poured into the mold around the metal members. The assembly thus formed is heated to about 3000° F. At this temperature a pressure of about 2500 p.s.i. is applied to the ceramic particulate in the mold. The application of heat and pressure causes the ceramic particulate to form a dense, fired ceramic body having a metal member sealed in a vacuum-tight manner thereto.

Further objects and advantages of the present invention will be apparent from the following detailed description, reference being had to the drawings wherein a preferred embodiment of the present invention is clearly shown.

In the drawings:

FIGURE 1 shows an exploded perspective view of the three-part mold assembly;

FIGURE 2 is a cross-sectional view of the mold and charge assembly prior to heating;

FIGURE 3 is a cross-sectional view of the mold and charge assembly shown in FIGURE 2 after the heat and pressure is applied;

FIGURE 4 is a cross-sectional view of an electrode assembly having a ceramic-to-metal seal.

The invention will be described in detail in terms of a composite alumina-to-niobium center electrode for use in vacuum devices. The alumina-to-niobium center electrode consists of an alumina body in the form of a disc having a niobium electrode passing through the center of the disc and having a niobium annular ring bonded to the outer periphery and one side of the disc. The alumina-to-niobium center electrode is formed by sintering alumina particulate positioned about the niobium members under pressure in a mold at the sintering temperature of alumina to form a vacuum-tight bond between the alumina and the niobium members. As a consequence, the alumina-to-niobium seal will remain vacuum-tight at elevated temperatures which are below the sintering temperature of the alumina.

Referring now to the drawings, FIGURE 1 shows a three-part mold assembly consisting of the mold 10, the lower punch 12 and the upper punch 14. The mold assembly parts are made of graphite preferably to withstand the elevated temperature. The mold 10 has a stepped centerbore 16 wherein the centerbore portion 17 surrounds the top punch 14 and centerbore portion 18 having a somewhat larger diameter surrounds the lower punch 12. The lower punch 12 has a portion 19 protruding outwardly from the upper surface 20. The upper punch 14 has a stepped centerbore 22, the lower portion 23 thereof providing a tight fit for a molybdenum alloy core 32 which will be hereinafter discussed in connection with FIGURE 2.

A circular molybdenum wafer 24 having a centerbore therethrough is positioned on top of the lower punch 12 whereby the portion 19 protrudes through the wafer 24 centerbore. The purpose of the molybdenum wafer is to facilitate the removal of the ceramic-to-metal seal from the mold assembly and to reduce the contamination of the seal caused by the graphite mold at elevated temperatures. The wafer 24 may be made of a suitable refractory metal such as tungsten, molybdenum and tantalum. A molybdenum wafer is preferred in view of its relatively low cost.

A niobium center core 30 having a hole 29 in the center of one end thereof and a hole 31 in the center of the other end is positioned on top of the molybdenum wafer 24 so that the lower punch portion 19 fills the hole 29. The core 30 is made of niobium or a niobium alloy, such as that referred to earlier. It is essential that the meal core 30 has a coefficient of thermal expansion similar to that of the ceramic and a modulus of elasticity which is low when compared to that of the ceramic. The metal in core 30 should be the same or similar to the metal in the ring 26.

A niobium ring 26 in the form of an annular L-shaped or flanged member is inserted up into the centerbore portion 18 of the mold 10 so that the upper end thereof is positioned at the point where the centerbore portion 18 meets the centerbore portion 17 as shown in FIGURE 2. The surface 25 of the side of the ring 26 is in contact with the walls of the centerbore portion 18 of the mold 10. It is necessary that the ring 26 be formed of niobium or an alloy containing at least 65 weight percent niobium. Niobium is the only suitable metal for this ceramic-to-metal seal known at this time since the metal must be able to withstand temperatures in the range of 3000° F., have a linear coefficient of thermal expansion similar to alumina, and have modulus of elasticity considerably lower than alumina. The linear coefficient of thermal expansion for alumina is $9.0 \times 10^{-6}$ over a temperature range of from 0 to 1000° C. The corresponding coefficient of thermal expansion for niobium is $6.9 \times 10^{-6}$ and for the niobium alloy containing approximately 10% titanium, 10% molybdenum and 80% niobium and the coefficient of expansion is $7.4 \times 10^{-6}$. The values of $6.9 \times 10^{-6}$ and $7.4 \times 10^{-6}$ are sufficiently close to that of alumina, $9.0 \times 10^{-6}$ for the practice of this invention. Alumina has a modulus of elasticity of $52 \times 10^{-6}$ p.s.i. at 20° C. The corresponding modulus of elasticity for niobium is $15 \times 10^6$ p.s.i. and for the niobium alloy previously referred to it is $16.5 \times 10^6$ p.s.i. The values of $15 \times 10^6$ and $16.5 \times 10^6$ are sufficiently low when compared to that of alumina, $52 \times 10^6$ for the practice of this invention. In contrast, a seal formed with molybdenum alloy containing 0.5 weight percent titanium having a low coefficient of thermal expansion of $4.9 \times 10^{-6}$ and a high modulus of elasticity of $50 \times 10^6$ was found to form an unsatisfactory seal having radial cracks in the alumina thereby indicating that a metal having these values is not suitable for use with alumina. It is believed that in order for a refractory metal to be operative at high temperatures in this seal, it must have a coefficient of thermal expansion similar to the ceramic used and it must also have a low modulus of elasticity.

The lower punch 12 having the molybdenum wafer 24 and the niobium center core 30 positioned thereon is inserted into the centerbore portion 18 of the mold 10 so that a portion of the upper surface of the wafer 24 is in contact with the bottom surface 27 of the ring 26 as shown in FIGURE 2.

A cylindrical molybdenum liner 28 is positioned in the centerbore 17 of the mold 10 on top of the niobium ring 26 so that it is in touching relationship with the walls of the centerbore 17. The purpose of the molybdenum liner 28 is to reduce the contamination of the seal caused by the graphite mold at elevated temperatures. The molybdenum liner 28 may be formed of other suitable refractory metal, such as tungsten, tantalum, and the like.

A molybdenum core 32 having an end portion 33 of reduced diameter is positioned on top of the niobium core 30 so that the end portion 33 fits closely in the hole 31. The core 32 may be formed of any suitable refractory metal such as molybdenum, tungsten, tantalum and niobium with molybdenum being preferred in view of its low cost.

Ceramic powder 34 is poured into the mold centerbore 17 around and above the niobium core 30 and above the niobium ring 26. The ceramic powder 34 is preferably alumina since it has been found that alumina can withstand elevated temperatures and has a coefficient of thermal expansion similar to that of niobium and niobium alloys as well as having a relatively high modulus of elasticity when compared with niobium. The particle size of the alumina powder is not critical although a particle size which passes through a 325 mesh screen sieve is preferred. An upper molybdenum wafer 36 having a centerbore 37 therethrough is positioned on top of the ceramic powder 34 so that the molybdenum core 32 passes through a centerbore 37. Other suitable wafers 36 may be made from tungsten, tantalum, and niobium. The purpose of the upper wafer 36 is the same as for the wafer 24. The upper punch 14 is placed into the mold centerbore 17 so that it rests on the wafer 36 and the molybdenum core 32 passes through the upper punch centerbore 22. The sides of the punch 14 are in touching relationship to the liner 28.

The mold assembly described above and shown in FIGURE 2 is placed in a furnace and inductively heated to 3000° F. When the assembly has reached this temperature, a pressure of 2500 p.s.i. is applied through the punch 14 by conventional means and maintained for 15 minutes. The application of heat and pressure compacts and sinters the alumina powder 34 so that the top surface 35 of the fired alumina 34 protrudes only slightly above the top surface of both the niobium core 30 and the ring 26 as shown in FIGURE 3. After cooling, the alumina-to-niobium seal assembly is removed from the mold and stripped from the punches and the molybdenum core. The adhering molybdenum liner is also removed from the seal assembly.

The finished seal which is shown in FIGURE 4 is obtained by grinding the exterior surfaces of the alumina-to-niobium assembly with a 180 mesh diamond grit wheel. The holes 29 and 31 in the niobium core 30 are then tapped or threaded and threaded niobium electrode wires 38 and 40 are screwed into position into the niobium core 30. The wires 38 and 40 should be made of the same metal as the core. This finished seal is used in high temperature vacuum application wherein the niobium ring 26 comes in sealing vacuum-tight contact with another metal element 42 thereby providing a seal preventing the movement of gas therethrough. Current is passed through the electrode circuit formed by the core 30, wire 38 and wire 40. Alumina-to-niobium and alumina-to-niobium alloy seals have been made according to this invention which are operational at temperatures in the range of 2700° F. under conditions which are relatively non-oxidizing to the niobium.

While the invention has been described in terms of a preferred embodiment, it is to be understood that it is not limited thereby except as defined in the following claims.

What is claimed is:

1. A method of making a composite body comprising a sintered alumina member and niobium member comprising the steps of placing said niobium member in a mold, placing ceramic particulate against said niobium member, heating said particulate and said niobium member to the sintering temperature of said particulate, and applying pressure to said particulate whereby said particulate is compressed into a dense, fired alumina body having a vacuum-tight bond with said niobium member.

2. A method as described in claim 1 wherein said pressure is in the range of about 2000 to 3000 p.s.i.

3. A method as described in claim 1 wherein said alumina is heated to a temperature of about 2800 to 3200° F.

4. A high temperature composite ceramic-to-metal article for use in vacuum-type devices comprising a fired alumina portion having a centerbore therethrough, a tubular metal member containing niobium positioned in said centerbore adjacent to and in contact with the walls of said centerbore, said metal member combining with said walls of said centerbore to provide a vacuum-type bond therebetween, means for conducting current to and from each end of said tubular metal member, and an annular flanged metal member containing niobium positioned adjacent to and in contact with the outer periphery and one side of said alumina portion, said metal member combining with said alumina portion to provide a vacuum-type bond therebetween.

References Cited

UNITED STATES PATENTS

| 2,106,394 | 1/1938 | Mitchell | 287—189.365 X |
| 3,006,984 | 10/1961 | Bol et al. | 174—50.61 X |
| 3,088,299 | 5/1963 | McMahon et al. | 65—59 X |
| 3,275,359 | 9/1966 | Graff | 287—189.365 |
| 3,243,635 | 3/1966 | Louden et al. | 220—2.1 X |

FOREIGN PATENTS

| 578,580 | 7/1946 | Great Britain. |
| 779,128 | 7/1957 | Great Britain. |
| 800,992 | 9/1958 | Great Britain. |

LARAMIE E. ASKIN, *Primary Examiner.*